(12) United States Patent
Potu (10) Patent No.: US 6,219,457 B1
(45) Date of Patent: Apr. 17, 2001

(54) METHOD AND SYSTEM FOR DECODING DATA ENCODED IN A VARIABLE LENGTH CODE WORD

(75) Inventor: Brahmaji Potu, Cupertino, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/084,290

(22) Filed: May 26, 1998

(51) Int. Cl.$^7$ .................................................. G06K 9/36
(52) U.S. Cl. ........................ 382/246; 358/427; 382/233; 341/67; 348/240.23
(58) Field of Search ................................. 382/246, 244, 382/245, 233; 341/65, 67, 59; 358/427, 261.1; 375/240.23, 240.25

(56) References Cited

U.S. PATENT DOCUMENTS

| | | | |
|---|---|---|---|
| 5,208,593 | * 5/1993 | Tong et al. | 341/65 |
| 5,253,053 | * 10/1993 | Chu et al. | 348/384 |
| 5,325,092 | * 6/1994 | Allen et al. | 341/65 |
| 5,559,831 | * 9/1996 | Keith | 375/240 |
| 5,600,812 | * 2/1997 | Park | 711/200 |
| 5,654,806 | 8/1997 | Truong | 358/427 |
| 5,675,332 | 10/1997 | Limberg | 341/67 |
| 5,818,364 | 10/1998 | Hintzman et al. | 341/65 |
| 5,825,312 | 10/1998 | D'Ortenzio | 341/65 |
| 6,043,765 | 3/2000 | Twardowski | 341/65 |
| 6,121,905 | 9/2000 | Redford | 341/67 |

* cited by examiner

Primary Examiner—Leo H. Boudreau
Assistant Examiner—Ishrat Sherali
(74) Attorney, Agent, or Firm—Sterne, Kessler, Goldstein & Fox PLLC (57) ABSTRACT

A novel technique for decoding variable length encoded data in a bit stream such as video data compressed in accordance with JPEG, MPEG, or DV standards is disclosed. The disclosed technique preprocesses the input data to generate a pointer to a variable length code table from the encoded code word, the entry in the variable length table providing the information necessary to decode the code word. Preprocessing of the input data includes encoding leading ones or leading zeros and selecting a subset of bits following the leading ones or zeros. The pointer to the variable length code table is generated from a base value corresponding to the symbol type being decoded. The base values for the symbols being decoded may be stored in a first look up table which may contain multiple entries for one or more of the symbol types, the number of entries corresponding to the number of leading ones or zeros.

19 Claims, 4 Drawing Sheets

METHOD AND SYSTEM FOR DECODING DATA ENCODED IN A VARIABLE LENGTH CODE WORD

FIELD OF THE INVENTION

The invention relates generally to processing of video data in a computer system. More particularly, the invention relates to variable length decoding of video data which is compressed using a standardized compression technique such as MPEG-1, MPEG-2, DV, or JPEG.

BACKGROUND OF THE INVENTION

Video images are rarely stored or transmitted in a computer system in an uncompressed format because of the vast amounts of memory required to store an unaltered and uncompressed video image. One color picture at standard television resolution requires approximately one million bytes to store the pixel representation of the image digitally. An uncompressed digitized color photograph at 35 mm resolution occupies approximately ten times more memory, approximately ten megabytes. Digital storage of a single roll of 35 mm film would require an entire 360 megabyte hard drive if the images were not compressed and it would take almost an hour to receive a single digitized photograph over a standard modem link if the image were not compressed.

In order to make digital storage and transmission of video images practicable, various techniques for compressing digital images have been devised. One of the most widely used techniques for video compression is the so-called JPEG standard, an internationally recognized compression standard which has been propounded by the Joint Photographic Expert Group a working group of the International Electrotechnical Commission and a collaboration between ITU and ISO that is applicable to continuous-tone (multilevel) images.

The JPEG standard uses adaptive transformation to achieve high compression. In adaptive transformation, the values of a group of pixels are transformed into another set that requires less data. The specific adaptive transformation used is the discrete cosine transform, a version of the Fourier transform that accounts for the fact that the input is essentially a limited set of samples of continuous waveforms. The discrete cosine transform is "lossy" because forward and inverse (i.e., encoding and decoding) discrete cosine transform equations contain transcendental functions and cannot be physically implemented with perfect accuracy. Moreover, the JPEG standard is also lossy because of a round off error introduced by quantization which produces a significant portion of the data compression. Additional data compression is achieved by statistical coding of the quantized discrete cosine transform frequency components, either arithmetically (e.g., Q-coding) or by Huffman coding. JPEG encoding can typically achieve compression ratios of 10:1 without significant degradation of image quality or resolution, and, in some cases, compression as high as 30:1 can be achieved.

The JPEG standard does not specify the details of particular algorithms that must be used for compliance with the JPEG standard. For example, the JPEG standard does not specify the implementation details of the discrete cosine transform and there are numerous distinct products that all incorporate substantially different implementations of discrete cosine transform encoders and decoders. The discrete cosine transform tends to be extremely processing intensive, which frequently results in a noticeable delay in decompression of a received (or retrieved) image. In an effort to ameliorate this delay, there are numerous prior art implementations of JPEG decoders that incorporate approximations of the discrete cosine transform that exchange accuracy for image quality.

Another area of the JPEG standard in which there is extensive variation between different implementations is statistical or entropy or binary encoding of the quantized discrete cosine transform coefficients output by the penultimate quantizer stage. Binary encoding, such as run-length encoding, is applied to each quantized discrete cosine transform coefficient that does not equal zero, producing an output including the number of preceding zeros, (i.e., the run length), the number of bits needed to describe the coefficient, and the value of the coefficient.

In much the same way that it does not require a particular implementation of the discrete cosine transform, the JPEG standard does not require a particular implementation of the coding scheme. In JPEG standard compression, the number of preceding zeros and the number of bits needed to describe the coefficient value form a pair which is associated with a code word assigned through a variable length code such as Huffman or Arithmetic coding. The value of the coefficient is also associated with a codeword defined in a variable length code and it is these codewords which comprise the variable length data symbols of the compressed video bit stream.

The JPEG standard is only one of many compression schemes that uses variable length encoding. The so-called MPEG (Motion Picture Expert Group of the International Electrotechnical Commission (IEC)) standards (MPEG-1 and MPEG-2) also utilize variable length encoding as well as many other aspects of JPEG encoding. The Digital Video (DV) standard also uses variable length encoding.

There is a common problem with JPEG, DV, MPEG-1, and MPEG-2, that problem being the difficulty of implementing an efficient and practicable way of decoding the compressed video when it is received or retrieved. In contemporary high performance graphics computer systems such as those manufactured by Silicon Graphics, there is a need for a system that is capable of decompressing variable length encoded video bit streams without requiring excessively large look up tables and/or an excessive number of table accesses.

The size of look up tables is constrained because excessively large look up tables precludes implementation in an ASIC (Application Specific Integrated Circuit) which is necessary to provide optimum performance and maximum flexibility. However, in the variable length codes used in JPEG, MPEG, or DV compression schemes, the code symbols are typically two to sixteen bits in length. Accordingly, the look up tables potentially have 64K entries (e.g., $2^{16}$ or 65,536, corresponding to 16 bits). This problem is compounded when color images are compressed because, depending upon the color space, multiple tables are typically required to account for the different components. For example, in a luminance/chrominance color space such as YCbCr, two tables are required, one for luminance and one for chrominance. Thus, 128K table entries are required, each table entry being 16 bits long. This situation is further exacerbated by the use of separate tables for the two different types of discrete cosine transform spatial frequency coefficients (DC and AC, as discussed below), which can substantially increase the number of tables and table entries required.

The number of times the look up tables can be accessed to decode each variable length encoded code word is limited by the desire to quickly perform video decoding to support high data rate bit streams. In one prior art embodiment, small look up tables are used to ameliorate the problem of impracticably large tables, with the small look up tables arranged in a branched tree data structure and pointer logic used to maintain track of the decoded value during video decoding. However, as many as four separate table look up operations are required to decode a single variable length encoded symbol and the additional overhead required for pointer maintenance further impedes optimal decoding of the compressed video data.

SUMMARY OF THE INVENTION

In view of the foregoing, there is a need for a technique that can decode compressed image data encoded in a variable length bit stream that can be implemented without requiring unreasonably large tables or an excessive number of table references that may render a decoder impracticable. The size of the look up tables is constrained by the desirability of implementing a flexible and generally applicable video bit stream decoder in a hardware implementation such as an ASIC, although the advantages of small table size are also present in software implementations of variable length bit stream decoders. Reducing the number of times look up tables need to be referenced is desirable because each table look up takes a finite period of time and video data typically has to be decoded at a very rapid rate, as quickly as fifty megabits per second for MPEG-2.

The present invention provides a novel technique for decoding of variable length encoded data symbols. As discussed below, the present invention provides significant reductions in the look up table size required to implement a variable length decoder without disadvantageously requiring an excessive number of table references. In a preferred embodiment of the present invention, all of the variable length encoded code words (i.e., coefficients) are decoded using only two table references.

The present invention preprocesses the variable length code data before referencing any table entries. The preprocessing step is based upon the variable length code table as defined by the standard. In the case of MPEG-1 and MPEG-2, the variable length codes used are predefined in the standard. This is also true of the proposed Digital Video (DV) standard. Unlike MPEG and Digital Video, the variable length codes in JPEG are not predefined by the standard, even though typical code tables are described in the JPEG standard. The JPEG standard does, however, define the algorithm used to generate the tables.

The variable length code in the MPEG standards is a leading 0 code, whereas the variable length code is a leading 1 code in JPEG and Digital Video standard compression schemes. In a preferred embodiment, the preprocessing includes counting the number of leading 1s in a JPEG compressed bit stream. In an alternative embodiment in which MPEG compressed data is decoded, the preprocessing includes counting the number of leading 0s.

A first table index is generated based on the type of symbol being decoded (i.e., whether DC chrominance, DC luminance, AC chrominance, or AC luminance), and, at least with respect to AC symbols, from the number of leading bits in the symbol being decoded. The entry in the first look up table, in conjunction with additional bits in the code word (i.e., following the leading bits (1s or 0s)), and the encoded number of leading bits (if not used to select the first table entry), are used to generate an address or pointer to a variable length code decoding table. The decoding table is then referenced at the generated address or pointer, and the referenced table entry is evaluated. The table entry at the location pointed to (or addressed) is evaluated to ascertain the variable length code values and the location of the next symbol in the bit stream. In a preferred embodiment of the present invention in which JPEG symbols are decoded, the variable length code table entry indicates the number of bits in the encoded run length, the number of magnitude bits, and the number of bits in the code word (i.e., how many bits to shift the data stream before processing the next code word).

In this manner, continuous decoding of a video bit stream is accomplished with a minimal number of processing steps and/or table look-ups, advantageously permitting a lower compression ratio (and proportionately higher image quality) without incurring an increase in the total time needed to decode an image. Although the specific implementation details vary depending upon the particular scheme being decoded, the disclosed technique may be advantageously applied to decoding (or encoding) of any variable length encoded bit stream, and is not limited to video encoding or JPEG standard compression.

DETAILED DESCRIPTION

A novel technique and apparatus for decoding variable length encoded data is described herein. For purposes of example only, the detailed description of the present invention is presented primarily with respect to video data encoded in accordance with the JPEG compression standard. However, the present invention is not limited to JPEG compression and is equally applicable to any form of variable length encoded data streams such as Digital Video ("DV"), MPEG-1 or MPEG-2.

Figure 1:
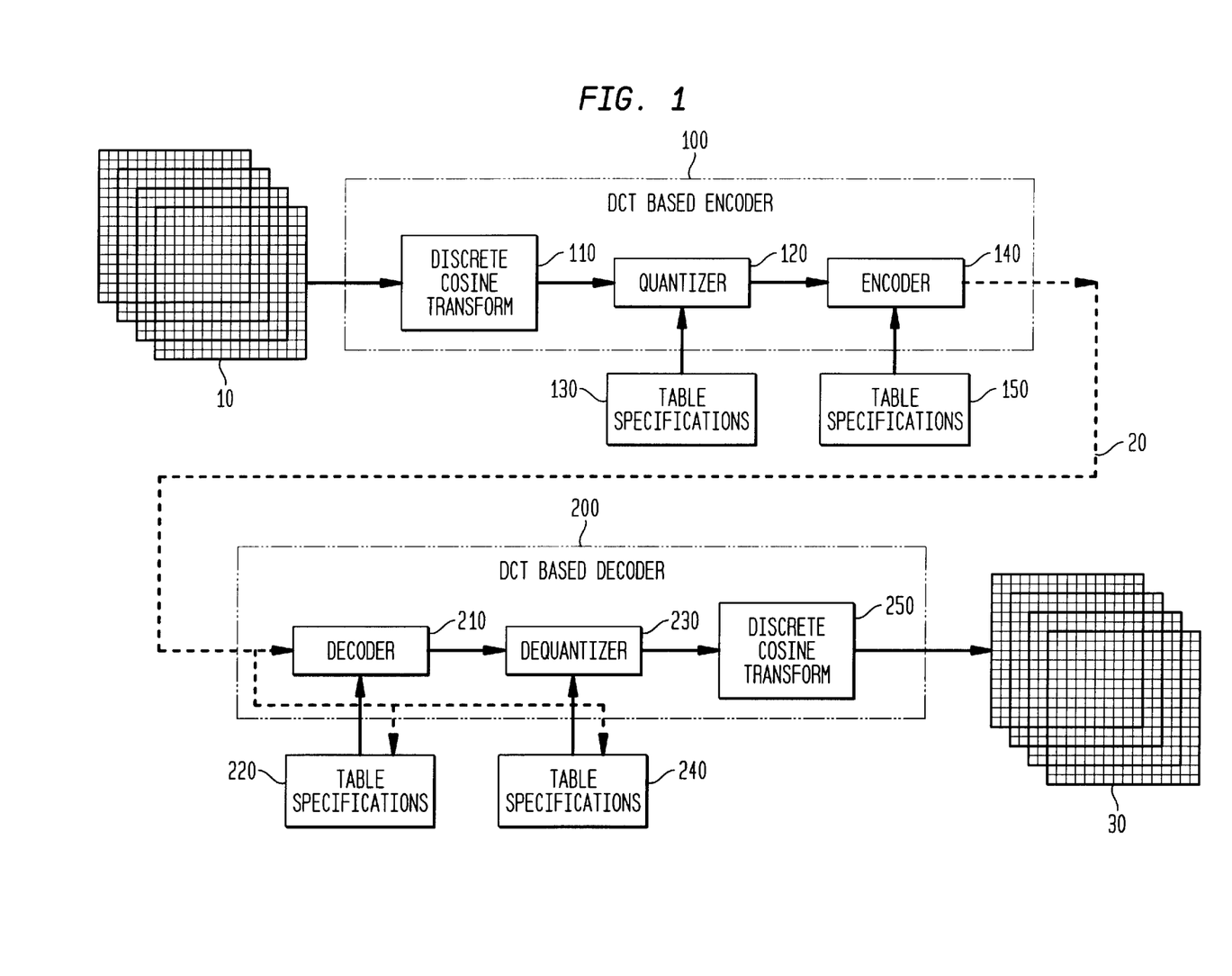
FIG. 1 is a diagrammatic illustration of JPEG encoding and decoding.

A preferred embodiment of the present invention provides efficient decoding of a JPEG encoded video data bit stream. Referring to FIG. 1, JPEG compression is performed as follows. A video image 10 is divided into 8×8 data units. If the video image is a gray scale image, without any color information, then a data unit will correspond to a block. However, JPEG compression is typically applied to color images. In a preferred embodiment, the image is transformed into or is already represented by a luminance/chrominance color space, 4:2:2 YCrCb, and a macro block consists of four blocks: two luminance (Y), and two chrominance (Cr and Cb). Each component is encoded separately and the image is encoded in a sequence of macro blocks.

The video image is processed by a discrete cosine transform based encoder 100 which generates a bit stream of compressed video data 20 from video image 10. Each 8×8 block is processed by a discrete cosine transform 110 which provides a one-to-one mapping for 64 point vectors between the image domain and the frequency domain. The discrete cosine transform function that encodes image data may be expressed by the following equation.

$$F(u, v) = \frac{1}{4}C(u)C(v)\left[\sum_{x=0}^{7}\sum_{y=0}^{7}f(x, y)*\cos\frac{(2x+1)u\pi}{16}\cos\frac{(2x+1)v\pi}{16}\right] \quad (1)$$

where C(u), C(v)=1/√2 for u,v=0; C(u), C(v)=1 otherwise. The discrete cosine transform outputs a set of 64 discrete cosine transform coefficients that represent the relative amount of the two-dimensional spatial frequencies contained in the 64 points of the 8×8 block. The coefficient with zero frequency in both dimensions, located at 0,0, is the DC coefficient. The remaining 63 coefficients are the AC coefficients.

Figure 2:
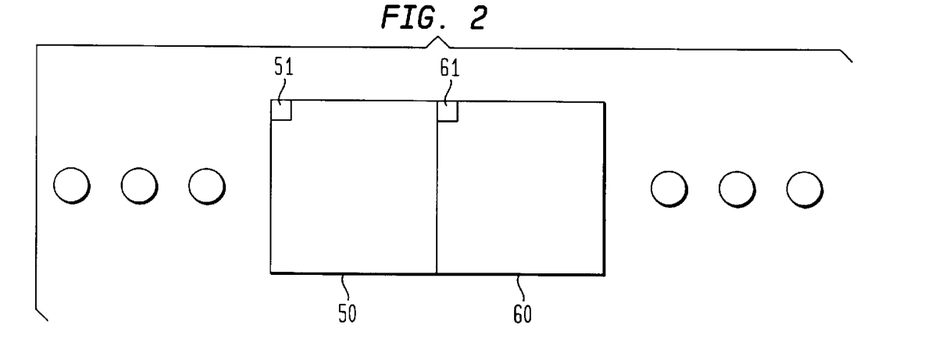
FIG. 2 is an illustration of the differential DC encoding in the preparation of quantized coefficients for entropy coding.

Referring to FIG. 2, the DC coefficients 51 and 61 of two adjacent blocks 50 and 60 are shown. In JPEG compression, DC coefficients are differentially encoded based on the DC coefficient of the previous block in order to benefit from the typically high correlation between the DC coefficients of adjacent blocks. Unique treatment of DC coefficients is generally deemed worthwhile because the DC coefficients typically contain a significant fraction of the total image energy.

Referring again to FIG. 1, the discrete cosine transform coefficients are then quantized by quantizer 120 which essentially divides each coefficient by a specified quantum and rounds the result to the nearest integer. A quantization matrix 130 specifies the quantum to be used for each discrete cosine transform coefficient.

Figure 3:
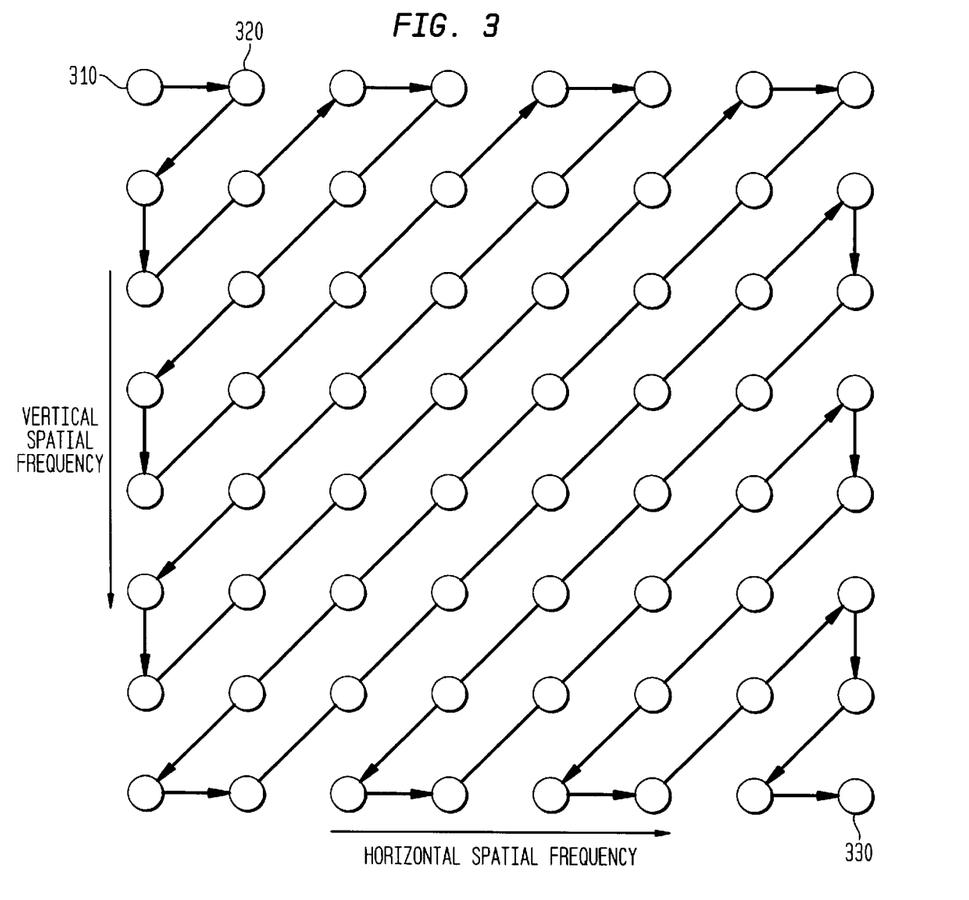
FIG. 3 is an illustration of the zig-zag sequence used in the preparation of quantized coefficients for entropy coding.

In general, most of the signal data is concentrated in the lower spatial frequencies and the low frequency discrete cosine transform coefficients are more likely to have non-zero values. Accordingly, the quantized coefficients are ordered in a zig-zag sequence as shown in FIG. 3. Referring to FIG. 3, the sequence begins with the DC coefficient 310 and proceeds to the two lowest spatial frequency AC coefficients beginning with the AC coefficient 320 and ending with the highest spatial frequency AC component 330 at the far corner of the 8×8 block. The zig-zag ordering of the discrete cosine transform coefficients may precede or follow quantization.

Referring again to FIG. 1, the ordered coefficients are processed by encoder 140. The encoder 140 converts the coefficients into symbols in the JPEG defined statistical model for Huffman encoding and performs entropy coding on the quantized discrete cosine transform coefficient symbols. The encoder 140 outputs a continuous data stream of compressed video images in which the codes no longer have periodic regular boundaries. There are two forms of entropy encoding defined in the JPEG standard: Huffman encoding or arithmetic encoding. Huffman encoding typically produces less compression but is generally considered to be faster and more suitable for hardware implementations than arithmetic coding. Although both Huffman encoding and arithmetic coding use different statistical models, the models are generally similar because JPEG intended to facilitate transcoding between arithmetically encoded data streams and Huffman encoded data streams.

The zig-zag ordering of the AC discrete cosine transform coefficients is advantageous in that the AC coefficients most likely to have zero values (i.e., those having the highest spatial frequencies) are concentrated at the end of each 8×8 block. Accordingly, these AC coefficients can be combined and run-length encoded for additional compression. Run-length encoding of the zero value discrete cosine transform coefficients advantageously eliminates the need for genera-
tion of individual code words for almost all zero value coefficients. However, if a string of fifteen or more consecutive zeros appears in a block, a ZRL symbol is generated, unless the last of the zero coefficients in a block is a zero, in which case an EOB marker symbol is generated.

As noted above, DC and AC coefficients are not identically encoded. Accordingly, the code words generated by encoder 140 have a different structure depending upon the type of coefficient being encoded. The code word for an AC coefficient is comprised of a pair of symbols, the first symbol representing the run-length (i.e., the number of zero value coefficients (up to 15) preceding the nonzero coefficient represented by the symbol) and the number of bits needed to represent the magnitude of the nonzero coefficient in the second symbol. The second symbol is the magnitude of the AC discrete cosine transform coefficient.

Unlike the AC coefficients, the DC coefficients are differentially encoded. Each differentially encoded DC coefficient is represented by a pair of symbols, the first symbol being a Huffman encoded representation of the size of the difference between DC coefficients. For DC coefficients, the JPEG standard defines a series of logarithmically varying range sets (e.g., one set is defined as −7, . . . , −4, +4, . . . , +7). The Huffman encoded symbol describes which set the difference falls in and the number of bits needed to specify the sign and magnitude of the difference. The second symbol is a variable length code (VLC) representation of the sign and magnitude of the difference.

The first symbol of a coefficient is encoded by encoder 140 into a variable length code word specified by table specifications 150. Some prior art implementations of variable length coding systems maintained two different sets of tables, one for AC components and one for DC components, as well as separate tables also being maintained for the luminance components and chrominance components respectively, at least in part because the size of the tables frequently made optimal storage difficult, particularly in limited memory graphics processing subsystems. The present invention, in contrast, utilizes one compound table for luminance and chrominance components of AC and DC discrete cosine transform coefficients.

The second symbol, representing the magnitude (and sign, for a DC coefficient) is also transformed by encoder 140 into a variable length code, the length of the second symbol (the value) being defined in the code word of the first symbol. The algorithm for transforming the second symbol is defined by the JPEG specification.

Referring to FIG. 1, an undifferentiated bit stream is generated by DCT based encoder 100. The bit stream is comprised of code words of up to 16 bits in length followed by up to 10 bits of encoded magnitude information. In order to extract the information and recreate the image, bit stream 20 is processed by DCT based decoder 200. In a typical DCT based decoder 200, the bit stream is received by decoder 210. The code word is extracted from bit stream 20 and decoded in accordance with table specifications 220. The subsequent magnitude bits specified in the decoded code word are also decoded and the quantized discrete cosine transform coefficients are then processed by dequantizer 230 in accordance with table specifications 240. The dequantized coefficients are then transformed back into image components by an inverse discrete cosine transform as described by the following equation:

$$f(x, y) = \frac{1}{4}\left[\sum_{u=0}^{7}\sum_{v=0}^{7}C(u)C(v)F(u, v)*\cos\frac{(2x+1)u\pi}{16}\cos\frac{(2x+1)v\pi}{16}\right] \quad (2)$$

where C(u), C(v)=1/√2 for u,v=0; C(u), C(v)=1 otherwise. A reconstructed image 30 formed by decoded 8×8 macro blocks is then output by DCT based decoder 200.

In the present invention, the operation of the decoder 210 has been substantially enhanced. As noted above, by pre-processing the incoming bit stream data, the total table space needed to decode the variable length encoded DC and AC coefficients is substantially reduced from the four relatively large tables used in some prior art implementations without undesirably increasing the number of lookups required and advantageously allowing performance-enhancing pipelining.

In a preferred embodiment of the present invention directed to JPEG decompression, only two relatively small tables are required for decoding. A first lookup table with thirty-four (34) sixteen bit entries that requires only 544 bits or 68 bytes of storage space and a second variable length code table with 504 entries of 16 bits (2 bytes) that only occupies 1008 bytes, for a total table space of only 1076 bytes provides all the information needed for Huffman decoding of luminance and chrominance components of AC and DC symbols.

Minimum space tables are generated by eliminating redundant entries and optimizing for many to one mapping which is possible because of the preprocessing used to generate table indices. Four unique base addresses correspond to DC luminance (Y), DC chrominance (C), AC luminance (Y), and AC chrominance (C). The number of tables entries required is minimized by generating indices for samples based on the permitted values of leading ones, thereby making it possible to collapse the leading sequence of is and interpret the next four bits to identify a variable length code table entry.

Each variable length code table entry indicates the size of the variable length code word and the magnitude information, thereby controlling the number of bits shifted out of the register during decoding. Each code word also indicates the run length information (i.e., the number of preceding 0s for a run-length encoded AC coefficient). Accordingly, the information from a variable length code table entry is used to shift the appropriate number of magnitude bits, ascertain the encoded run length (where applicable), and shift to the next code word to be decoded in the data stream.

Advantageously, each table entry provides a mechanism for error-checking. In an embodiment of the present invention, the most significant bit of each valid table entry is a '1'. Thus, for example, where each table entry is 16 bits long, the hexadecimal value of the four most significant bits is equal to or greater than $8_{16}$ ($1000_2$). The error-checking bit may be evaluated using any of a number of techniques known to those of ordinary skill in the art, such as, for example, performing a logical AND operation on the table entry with a mask value.

Table 1 below is exemplar of a table entry index table for JPEG decoding in accordance with a preferred embodiment of the present invention.

TABLE 1

Variable Length Code Table Addresses and Number of Bits Selected After Leading Ones

| | | | | | | | |
|---|---|---|---|---|---|---|---|
| 2000 | 2040 | 0 | 0 | 0 | 0 | 0 | 0 |
| 2080 | 2084 | 2088 | 208C | 3090 | 3098 | 30A0 | 30A8 |
| 30B0 | 60B8 | 50F8 | 4118 | 3128 | 2130 | 2134 | 2138 |
| 213C | 2140 | 2144 | 2148 | 314C | 3154 | 315C | 3164 |
| 316C | 6174 | 51B4 | 41D4 | 31E4 | 21EC | 21F0 | 21F4 |

In Table 1, the first and second entries correspond to DC luminance and DC chrominance respectively. There are 16 entries for AC luminance and AC chrominance, respectively. The AC luminance and AC chrominance entries, unlike the DC luminance and chrominance entries, include information relating to the number of leading 1s. Accordingly, the variable length code table addresses for the DC symbols are generated differently from the variable length code table addresses for the AC symbols, as discussed below.

Table 2 is an example of a variable length code table for JPEG decoding in a preferred embodiment of the present invention wherein Huffman coding is used.

TABLE 2

Variable Length Decoding

| | | | | | | | |
|---|---|---|---|---|---|---|---|
| 8200 | 8200 | 8401 | 8502 | 8603 | 8603 | 8704 | 8704 |
| 8805 | 8805 | 8805 | 8805 | 8a06 | 8a06 | 8a06 | 8a06 |
| 8c07 | 8c07 | 8c07 | 8c07 | 8e08 | 8e08 | 8e08 | 8e08 |
| 9009 | 9009 | 9009 | 9009 | 920a | 920a | 920a | 920a |
| 940b | 940b | 940b | 940b | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 8200 | 8200 | 8301 | 8301 | 8402 | 8402 | 8402 | 8402 |
| 8603 | 8603 | 8603 | 8603 | 8804 | 8804 | 8804 | 8804 |
| 8a05 | 8a05 | 8a05 | 8a05 | 8c06 | 8c06 | 8c06 | 8c06 |
| 8e07 | 8e07 | 8e07 | 8e07 | 9008 | 9008 | 9008 | 9008 |
| 9209 | 9209 | 9209 | 9209 | 940a | 940a | 940a | 940a |
| 960b | 960b | 960b | 960b | 0 | 0 | 0 | 0 |
| 0 | 0 | 0 | 0 | 0 | 0 | 0 | 0 |
| 0 | 0 | 0 | 0 | 0 | 0 | 0 | 0 |
| 8301 | 8301 | 8402 | 8402 | 8603 | 8603 | 8400 | 8804 |
| 8511 | 8511 | 8a05 | 8712 | 8621 | 8621 | 8731 | 8741 |
| 8d06 | 8d06 | 8a13 | 8a13 | 8851 | 8851 | 8861 | 8861 |
| 8f07 | 8f07 | 8a22 | 8a22 | 8971 | 8971 | 8d14 | 8b32 |
| 8a81 | 8a81 | 8a91 | 8a91 | 8aa1 | 8aa1 | 9208 | 8d23 |
| 8c42 | 8c42 | 8bb1 | 8bb1 | 8bc1 | 8bc1 | 9015 | 8d52 |
| 8cd1 | 8cd1 | 8bf0 | 8bf0 | 9024 | 8f33 | 8e62 | 8e72 |
| 9182 | 9182 | 9909 | 9a0a | 9616 | 9717 | 9818 | 9919 |
| 9a1a | 9525 | 9626 | 9727 | 9828 | 9929 | 9a2a | 9434 |
| 9535 | 9636 | 9737 | 9838 | 9939 | 9a3a | 9343 | 9444 |
| 9545 | 9646 | 9747 | 9848 | 9949 | 9a4a | 9353 | 9454 |
| 9555 | 9656 | 9757 | 9858 | 9959 | 9a5a | 9363 | 9464 |
| 9565 | 9666 | 9767 | 9868 | 9969 | 9a6a | 9373 | 9474 |
| 9575 | 9676 | 9777 | 9878 | 9979 | 9a7a | 9383 | 9484 |
| 9585 | 9686 | 9787 | 9888 | 9989 | 9a8a | 9292 | 9393 |
| 9494 | 9595 | 9696 | 9797 | 9898 | 9999 | 9a9a | 92a2 |
| 93a3 | 94a4 | 95a5 | 96a6 | 97a7 | 98a8 | 99a9 | 9aaa |
| 92b2 | 93b3 | 94b4 | 95b5 | 96b6 | 97b7 | 98b8 | 99b9 |
| 9aba | 92c2 | 93c3 | 94c4 | 95c5 | 96c6 | 97c7 | 98c8 |
| 99c9 | 9aca | 92d2 | 93d3 | 94d4 | 95d5 | 96d6 | 97d7 |
| 98d8 | 99d9 | 9ada | 91e1 | 92e2 | 93e3 | 94e4 | 95e5 |
| 96e6 | 97e7 | 98e8 | 99e9 | 9aea | 91f1 | 92f2 | 93f3 |
| 94f4 | 95f5 | 96f6 | 97f7 | 98f8 | 98f8 | 99f9 | 99f9 |
| 9afa | 9afa | 9afa | 9afa | 0 | 0 | 0 | 0 |
| 8200 | 8200 | 8301 | 8301 | 8502 | 8502 | 8703 | 8511 |
| 8904 | 8a05 | 8621 | 8631 | 8c06 | 8812 | 8741 | 8751 |
| 8e07 | 8e07 | 8861 | 8861 | 8871 | 8871 | 8b13 | 8a22 |
| 8a32 | 8a32 | 8981 | 8981 | 9108 | 8d14 | 8b42 | 8a91 |
| 8aa1 | 8aa1 | 8ab1 | 8ab1 | 8ac1 | 8ac1 | 9309 | 8d23 |
| 8d33 | 8d33 | 8c52 | 8c52 | 8af0 | 8af0 | 9015 | 8d62 |
| 8d72 | 8d72 | 8cd1 | 8cd1 | 960a | 9216 | 9024 | 9034 |
| 8fe1 | 8fe1 | 8fe1 | 8fe1 | 9425 | 9425 | 90f1 | 90f1 |

TABLE 2-continued

Variable Length Decoding

| 9717 | 9818 | 9919 | 9a1a | 9626 | 9727 | 9828 | 9929 |
|------|------|------|------|------|------|------|------|
| 9a2a | 9535 | 9636 | 9737 | 9838 | 9939 | 9a3a | 9343 |
| 9444 | 9545 | 9646 | 9747 | 9848 | 9949 | 9a4a | 9353 |
| 9454 | 9555 | 9656 | 9757 | 9858 | 9959 | 9a5a | 9363 |
| 9464 | 9565 | 9666 | 9767 | 9868 | 9969 | 9a6a | 9373 |
| 9474 | 9575 | 9676 | 9777 | 9878 | 9979 | 9a7a | 9282 |
| 9383 | 9484 | 9585 | 9686 | 9787 | 9888 | 9989 | 9a8a |
| 9292 | 9393 | 9494 | 9595 | 9696 | 9797 | 9898 | 9999 |
| 9a9a | 92a2 | 93a3 | 94a4 | 95a5 | 96a6 | 97a7 | 98a8 |
| 99a9 | 9aaa | 92b2 | 93b3 | 94b4 | 95b5 | 96b6 | 97b7 |
| 98b8 | 99b9 | 9aba | 92c2 | 93c3 | 94c4 | 95c5 | 96c6 |
| 97c7 | 98c8 | 99c9 | 9aca | 92d2 | 93d3 | 94d4 | 95d5 |
| 96d6 | 97d7 | 98d8 | 99d9 | 9ada | 92e2 | 93e3 | 94e4 |
| 95e5 | 96e6 | 97e7 | 98e8 | 99e9 | 9aea | 92f2 | 93f3 |
| 94f4 | 95f5 | 96f6 | 97f7 | 98f8 | 98f8 | 99f9 | 99f9 |
| 9afa | 9afa | 9afa | 9afa | 0    | 0    | 0    | 0    |

The first sixty-four entries in the table correspond to DC luminance component code words and the next sixty-four entries correspond to DC chrominance component code words. Both Cb and Cr chrominance components are decoded using the same table entries. The next 188 entries correspond to AC luminance component code words and the last 188 entries correspond to AC chrominance component code words. As with DC components, AC Cb and AC Cr chrominance components are decoded from a single set of table entries. The entire variable length code table may be addressed using only nine bits. The address of the first DC luminance code word decoding entry is $000_{16}$ (0 0000 $0000_2$), the address of the first DC chrominance code word decoding entry is $040_{16}$ (0 0100 $0000_2$), the address of the first AC luminance code word decoding entry is $080_{16}$ (0 1000 $0000_2$), and the address of the first AC chrominance code word decoding entry is $140_{16}$ (1 0100 $0000_2$).

Each entry in the variable length code table has a length of 16 bits. In the embodiment of the present invention of Table 2, the four least significant bits (0000 0000 0000 xxxx) indicate the number of magnitude bits. The next four bits (0000 0000 xxxx 0000) indicate the encoded run length. The next seven bits (0xxx xxxx 0000 0000) indicate the location of the next symbol in the data stream by indicating the number of bits that need to be shifted. In the embodiment of the present invention of Table 2, only five bits (000x xxxx 0000 0000) are needed to indicate the number of bits to shift as each encoded code word is less than 32 bits in length. The most significant bit is an error checking bit which is set to 1 in the embodiment of the present invention shown in Table 2.

Figure 4:
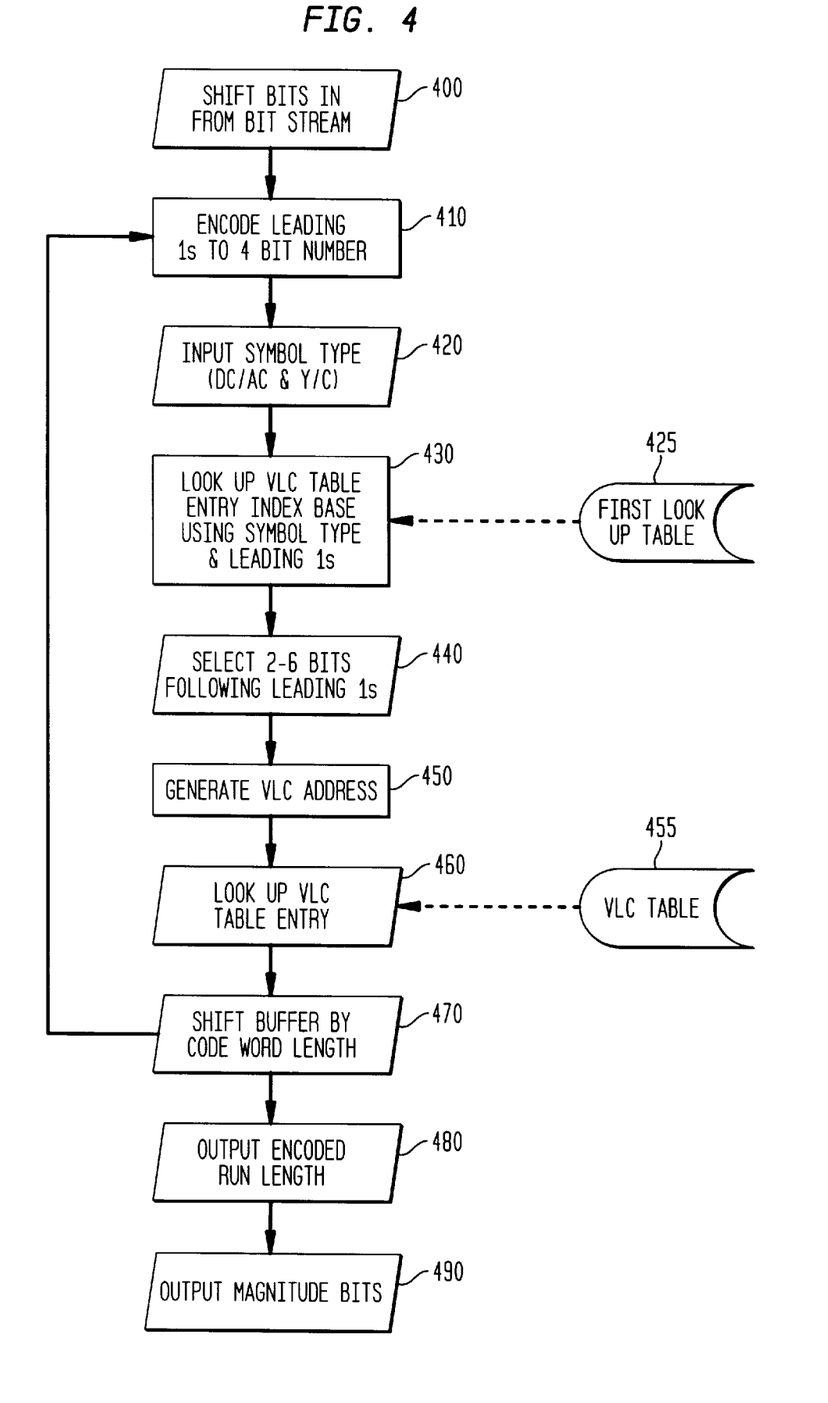
FIG. 4 is a flowchart illustration of a method of decoding in accordance with a preferred embodiment of the present invention.

Referring to FIG. 4, a preferred embodiment of the present invention begins variable length decoding by shifting bits from the input stream into a buffer as shown by input/output block 400. For JPEG decoding, a minimum of 16 bits are needed. However, it is desirable to use a buffer larger than 16 bits to enable pipelined operations. Accordingly, in a preferred embodiment of the present invention, a 64 bit barrel shifter provides buffering. The sixteen bits being processed are shifted out of the barrel shifter and the leading 1s in the 16 bit code word are encoded as shown by processing block 410. Encoding the leading 1s is accomplished by counting the number of leading 1s and generating a 4 bit number corresponding to the number of leading 1s. For example, if there are 7 leading 1s in the bit stream, then $0111_2$ is generated.

The type of code word being decoded is input as shown by input/output block 420. There are four possible code word types in the preferred embodiment of the present invention, DC luminance, DC chrominance, AC luminance and AC chrominance. Accordingly, only two bits are needed to identify the code word type. A first look up table 425 is then referenced as shown by block 430, the location referenced in the first look up table 425 depending upon the code word type and, in the case of AC coefficients, the number of leading 1s. For DC code words, the first look up table only contains one entry for chrominance and one entry for luminance. For AC code words, the first look up table contains 16 entries for chrominance and 16 entries for luminance, the specific entry used being dependent upon the number of leading 1s.

Referring to Table 1, the entry in the first look up table for a DC chrominance code word is $2040_{16}$. The entry in the first look up table for an AC chrominance code word without any leading 1s is $213C_{16}$, the entry in the first look up table for an AC chrominance code word with nine leading 1s is $6174_{16}$, and the entry in the first look up table for an AC chrominance code word with fifteen leading 1s (the maximum number allowed in a JPEG code word) is $21F4_{16}$. For an AC code word, the selected entry is the base entry for the code word type (chrominance or luminance) offset by the number of leading 1s.

Each of the entries in the first look up table (Table 1 above) includes information relating to the entry in the Variable Length Code table corresponding to the code word being decoded and the number of bits following the leading 1s that are selected to generate the address of the Variable Length Code table entry. In the embodiment of the present invention of Table 1, the four most significant bits indicate the number of bits following the leading ones that are selected and the nine least significant bits correspond to the base address of the variable length code table entry. Accordingly, each entry in the first look up table has the following format: aaaa xxxy yyyy yyyy, where $aaaa_{16}$ is the number of bits selected after the leading 1s, y yyyy $yyyy_{16}$ is the base address, and xxx are don't care bits. In an alternative embodiment of the present invention using a compressed first look up table, each entry in the first look up table is only twelve bits long as only three bits are required to select zero to seven bits following the leading ones (or zeros), and the variable length code table can be addressed using nine bits.

Referring again to FIG. 4, two to six bits following the encoded leading ones in the bit stream are selected as shown by input/output block 440. The number of bits selected for a particular code word being decoded are indicated by the corresponding entry in the first look up table. A variable length code table address (or pointer) is generated from the entry retrieved from the first look up table, the selected bits following the leading ones, and the encoded leading ones as shown by processing block 450. In the preferred embodiment of the present invention having a first look up table as shown in Table 1, the variable length code table addresses (or pointers) are generated differently for DC and AC code words as the first look up table entry for AC code words takes the number of leading ones into account.

For a DC code word, the variable length code table address (or pointer) is generated by concatenating the base address (0 0000 $0000_2$ for luminance or 0 0100 $0000_2$ for chrominance) with the encoded number of leading 1s (shifted left two bits) and the two selected bits (as the least significant bits). Because there are no overlapping bit positions between the base address, left shifted encoded leading 1s, and selected bits, the concatenation may be achieved by binary addition. Thus, the generated variable length code table address (or pointer) for a DC code word would have the following format: 0 0zyy yyxx$_2$, where z would be 1 for chrominance or 0 for luminance, yyyy would the number of leading 1s and xx would be the selected bits following the leading 1s.

For an AC code word, the variable length code table address (or pointer) is generated by adding the base address and the selected bits. In the case of AC code words, the number of leading 1s is taken into account during selection of the corresponding base address in the first look up table as discussed above, and, in contrast to DC code words, do not have to be separately considered when generating the variable length code table address (or pointer) from the base address retrieved from the first look up table.

The entry in the variable length code table 455 pointed to (or addressed by) the generated value is retrieved as indicated by input/output block 460. The retrieved variable length code table entry is evaluated to determine whether a valid entry has been retrieved and whether the code word indicates and End Of Block, End Of File, or other special marker. Each entry in the variable length code table has a length of 16 bits. For DC and AC code words in the embodiment of the present invention of Table 2, the four least significant bits (0000 0000 0000 xxxx) indicate the number of magnitude bits in the code word, the next four bits (0000 0000 xxxx 0000) indicate the encoded run length, and the next seven bits (0xxx xxxx 0000 0000) indicate how many bits the input buffer needs to be shifted for the next code word. The most significant bit is an error checking bit which is set to 1 to indicate a valid entry in the embodiment of the present invention shown by Table 2.

As shown by input/output block 470, the input buffer is shifted by the number of bits in the code word so the next code word is available for processing. At the same time, the encoded run length (for AC code words) is output as shown by input/output block 480. The magnitude bits of the code word, which are temporarily held in a magnitude buffer in a preferred embodiment of the present invention wherein a bottom aligned magnitude buffer is coupled to the output of the input buffer, are coupled to a magnitude register, the number of magnitude bits to be shifted into the magnitude register output to the magnitude register from the variable length code table entry as shown by input/output block 490. In an alternative embodiment of the present invention in which a magnitude bits buffer is not used to temporarily store the the magnitude bits, the magnitude bits must be extracted from the code word before it is shifted out of the input buffer. In the preferred embodiment of the present invention having a magnitude bits buffer, preprocessing of the next code word may be advantageously commenced before or simultaneously with magnitude bit processing.

Figure 5:
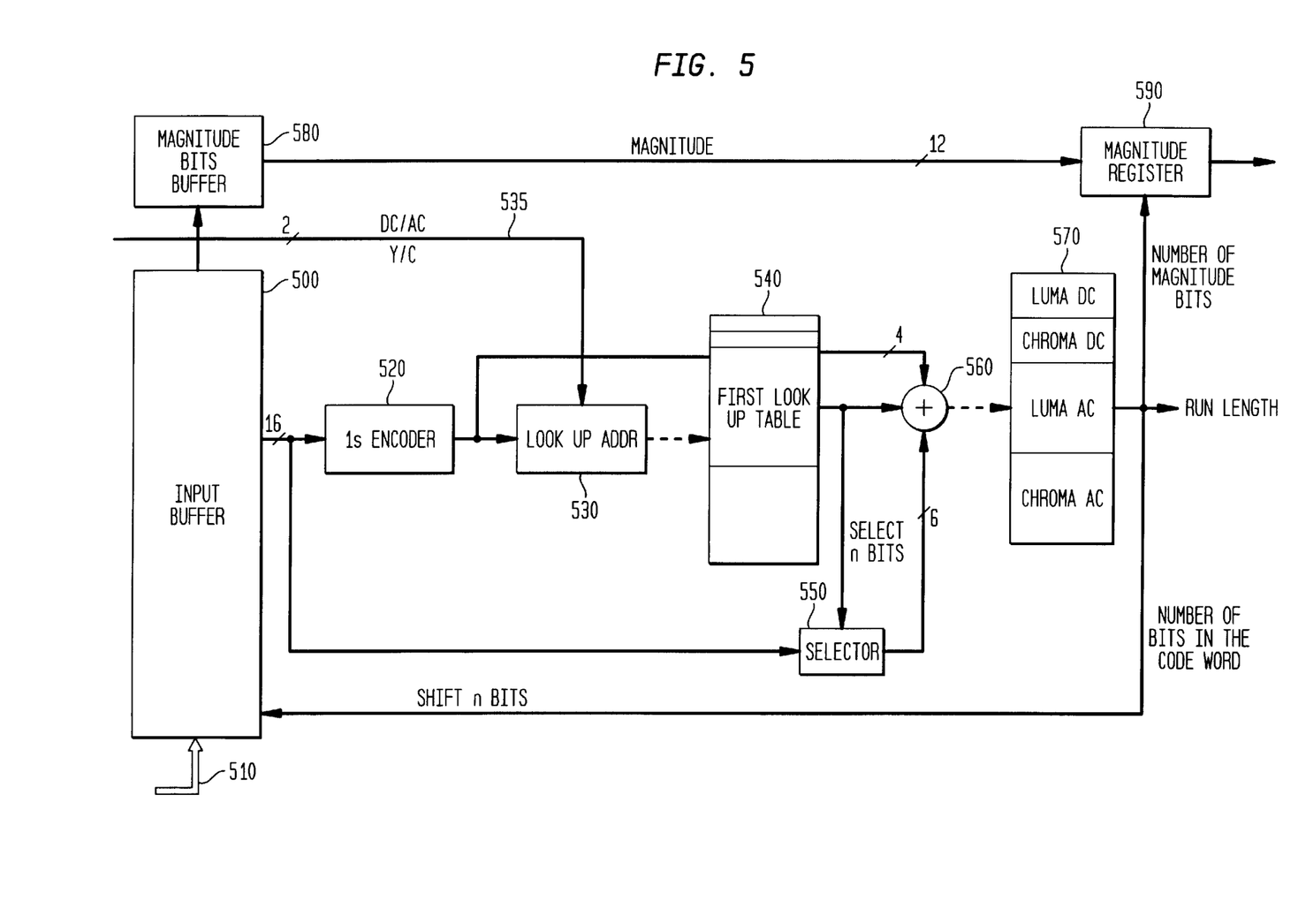
FIG. 5 is schematic representation of an embodiment of the present invention.

A schematic representation of an embodiment of the present invention is shown in FIG. 5. An input buffer 500 receives code words from a bit stream 510. In a preferred embodiment of the present invention, buffer 500 is larger than the maximum size of two codewords, including magnitude information, in order to support pipelining. For example, in an embodiment of the present invention that decodes JPEG compressed data, the buffer is 64 bits even though the largest token size is 26 bits, (up to sixteen bits for the variable length code word and up to ten bits for magnitude). In a preferred embodiment of the present invention, input buffer 500 is implemented using a 64 bit barrel shifter.

Sixteen bits are coupled from input buffer 500 to 1s encoder 520. In an alternative embodiment of the present invention intended for MPEG decoding, a 0s encoder is used, as MPEG encodes using leading 0s instead of leading 1s. The is encoder 520 counts the number of leading ones and outputs a four bit number corresponding to the number of leading ones to a first look up table address generator 530 and to a variable code length table address generator 560. A two bit code word identifier 535 is also input to first look up table address generator 530, and an entry in first look up table 540 is pointed to by the address generated. An embodiment of first look up table 540 is shown at Table 1.

The sixteen bits coupled from input buffer 500 are also coupled to an extra bit selector 550 which selects n bits following the last leading one in the coupled bits. The number of bits selected is determined by the value of specified bits in the entry pointed to in the first look up table 540. In a preferred embodiment of the present invention performing JPEG decoding, between two and six bits may be selected. In an alternative embodiment of the present invention performing DV decoding, between three and four bits may be selected.

The selected bits are output from extra bit selector to variable length code table address generator 560. The variable length code table address generator 560 also receives inputs from the first look up table 540 and 1s encoder 520. For DC code words, all three inputs are concatenated to generate an address (or pointer) to an entry in variable length code table 570, whereas for AC code words only the inputs from first look up table 540 and extra bits selector 550 are added to generate the address or pointer. An embodiment of variable length code table 570 is shown at Table 2.

The entry addressed in variable length code table 570 is evaluated to determine the encoded run length, the number of magnitude bits, and the total number of bits in the decoded code word. In the illustrated embodiment, input buffer 500 is shifted by the number of bits in the code word. A bottom aligned magnitude buffer 580 temporarily stores the last bits shifted out, including the magnitude bits. The number of magnitude bits indicated by the addressed variable length code table entry are input to magnitude register 590 and the code word is decoded.

Although various embodiments are specifically illustrated and described herein, it will be appreciated that modifications and variations of the present invention are covered by the above teachings and within the purview of the appended claims without departing from the spirit and intended scope of the invention. The present invention is readily adaptable to MPEG encoding which also includes 8×8 blocks and Huffman encoding, as well as JPEG type encoding of so-called intra frames. Furthermore, For example, bit streams that are compressed by coding schemes other than Huffman coding may be decoded in accordance with the present invention, including other variable length encoded data streams containing audio data or other types of digital information. Moreover, the present invention may be applied to encoding variable length codes, as well as decoding.

The present invention advantageously allows efficient decoding of variable length encoded data in a bit stream without requiring undesirably large tables or unacceptable delays in decoding time necessitated by multiple table lookups for each code word being decoded, while further providing a mechanism for efficient pipelined operations.

What is claimed is:

1. A method of decoding data encoded in a variable length code word in a system having a first look up table and a variable length code table, said method comprising the steps of:

receiving a plurality of bits comprising at least one encoded code word;

encoding a number of leading bits in the encoded code word;

providing the encoded number of leading bits to a first look up table address generator and to a variable length code table address generator;

generating a first pointer to an entry in the first look up table, said step comprising:
  receiving a code word type identification, and
  responsive to the code word type identification and the encoded number of leading bits, generating the first pointer that points to one of a plurality of entries in the first look up table;

evaluating the entry in the first look up table pointed to by the first table pointer;

generating a second pointer to an entry in the variable length code table, said step comprising:
  selecting a plurality of bits in the encoded code word following the leading bits,
  responsive to said step of evaluating the entry in the first look up table pointed to by the first pointer, determining a base address, and
  combining the encoded number of leading bits, the selected bits, and the base address to generate the second pointer; and evaluating the entry in the variable length code table pointed to by the generated second pointer to determine the number of magnitude bits in the variable length code word.

2. A method of decoding data encoded in a variable length code word in a system having a first look up table and a variable length code table, said method comprising the steps of:
  receiving a plurality of bits comprising at least one encoded code word;
  preprocessing at least one of the plurality of bits comprising at least one encoded code word, wherein said preprocessing step comprises;
    generating a first table pointer to an entry in the first look up table, said step comprising:
      receiving a code word type identification, and
      responsive to the code word type identification, generating the first table pointer that points to one of a plurality of entries in the first look up table,
      evaluating the entry in the first look up table pointed to by the first table pointer, and
    further processing at least one of the plurality of bits comprising at least one encoded word;
  generating a pointer to an entry in the variable length code table from said preprocessing, wherein said generating step comprises:
    encoding the number of leading ones in the encoded code word,
    selecting a plurality of bits in the encoded code word following the leading ones,
    responsive to said step of evaluating the entry in the first look up table pointed to by the first table pointer, determining a base address, and
    combining the encoded number of leading ones, the selected bits, and the base address, and
  evaluating the entry in the variable length code table pointed to by the generated pointer.

3. The method of claim 2, wherein said step of combining the encoded number of leading ones, the selected bits, and the base address comprises concatenation.

4. The method of claim 1, wherein said step of generating a first pointer to an entry in the first look up table comprises generating a first pointer responsive to the received code word type identification offset by the number of leading bits in the encoded code word.

5. The method of claim 1, wherein said step of combining the base address and the selected bits comprises addition.

6. The method of claim 1, wherein said step of evaluating the entry in the variable length code table pointed to by the generated second pointer comprises:
  determining the total number of bits in the encoded code word;
  determining the encoded run length in the encoded code word; and
  determining the number of magnitude bits in the encoded code word.

7. The method of claim 6, wherein said step of receiving a plurality of bits comprising at least one encoded code word comprises placing the plurality of bits in an input buffer, said method further comprising shifting the total number of bits in the encoded code word out of the input buffer.

8. The method of claim 7, wherein the input buffer includes an output coupled to a magnitude buffer, said method further comprising receiving the magnitude bits from the magnitude buffer.

9. The method of claim 1, wherein the encoded code word may be one of four types, a DC chroma type, a DC luma type, an AC chroma type, or an AC luma type, and the first look up table comprises entries for each of the types.

10. The method of claim 9, wherein the first look up table has one entry corresponding to a DC chroma type and one entry corresponding to a DC luma type.

11. The method of claim 10, wherein the first look up table has a plurality of entries corresponding to an AC chroma type and a plurality of entries corresponding to an AC luma type.

12. The method of claim 1, wherein said step of combining the encoded number of leading bits, the selected bits, and the base address comprises concatenating the base address with the encoded number of leading bits and the selected bits for a DC code word.

13. The method of claim 1, wherein said step of combining the encoded number of leading bits, the selected bits, and the base address comprises adding the base address and the selected bits for an AC code word.

14. A system for decoding data encoded in a variable length code word having one or more leading one or leading zero bits, said system comprising:
  an input buffer;
  an encoder coupled to said input buffer;
  a first look up table address generator coupled to said encoder;
  a first look up table responsive to said first look up table address generator;
  an extra bits selector coupled to said first look up table and to said input buffer;
  a variable length code table address generator coupled to said first look up table, said extra bits selector, and said encoder, wherein said variable length code table address generator concatenates inputs from said extra bits selector and said encoder to generate an address for an AC code word; and
  a variable length code table responsive to said variable length code table address generator.

15. The system of claim 14, wherein said input buffer is coupled to a magnitude bits buffer.

16. The system of claim 14, wherein said first look up table has a single entry for DC luminance, a single entry for DC chrominance, sixteen entries for AC luminance, and sixteen entries for AC chrominance.

17. The system of claim 14, wherein said variable length code table address generator concatenates inputs from said first look up table, said extra bits selector, and said encoder to generate an address for a DC code word.

18. The system of claim 14, wherein said encoder counts the number of leading zeros and outputs to said first look up table address generator and to said variable length code table address generator a number corresponding to the number of leading zeros.

19. The system of claim 14, wherein said encoder counts the number of leading ones and outputs to said first look up table address generator and to said variable length code table address generator a four bit number corresponding to the number of leading ones.

* * * * *